Aug. 13, 1940.        F. G. RICKER        2,211,580
CURLING MECHANISM FOR DOUGH MOLDERS
Filed April 28, 1939        3 Sheets-Sheet 3

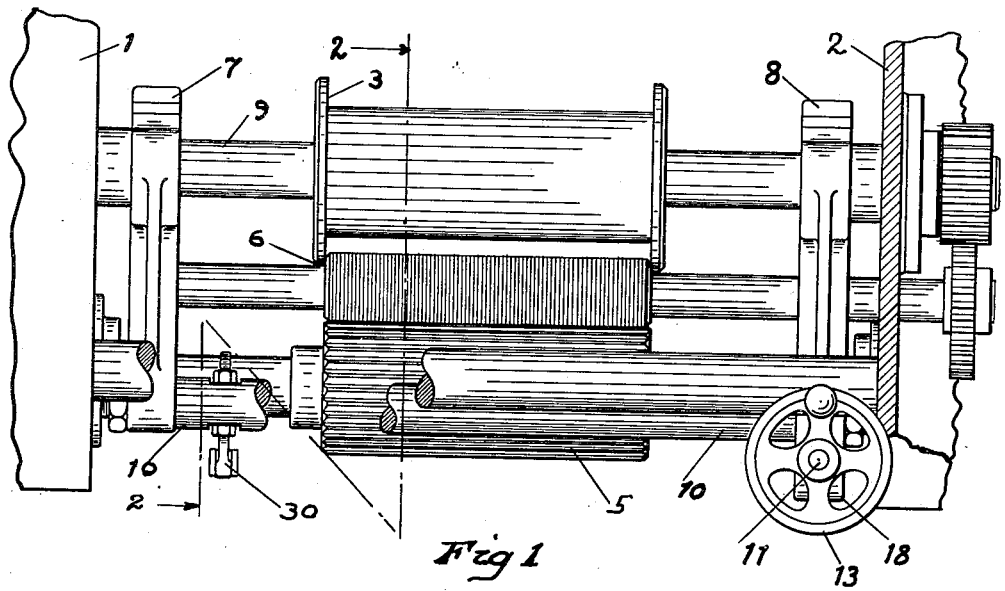
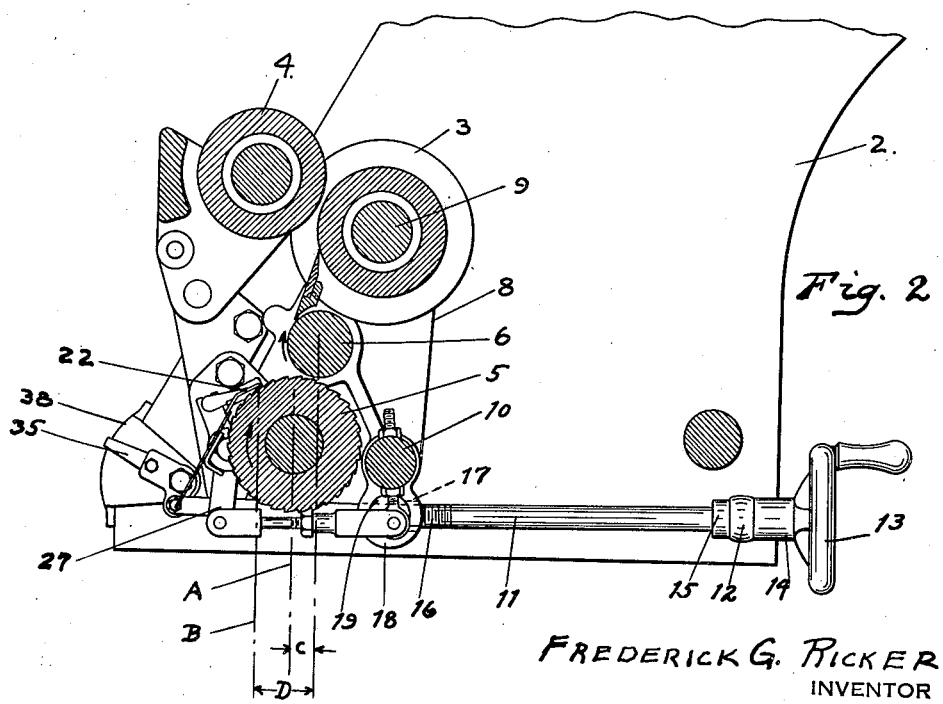

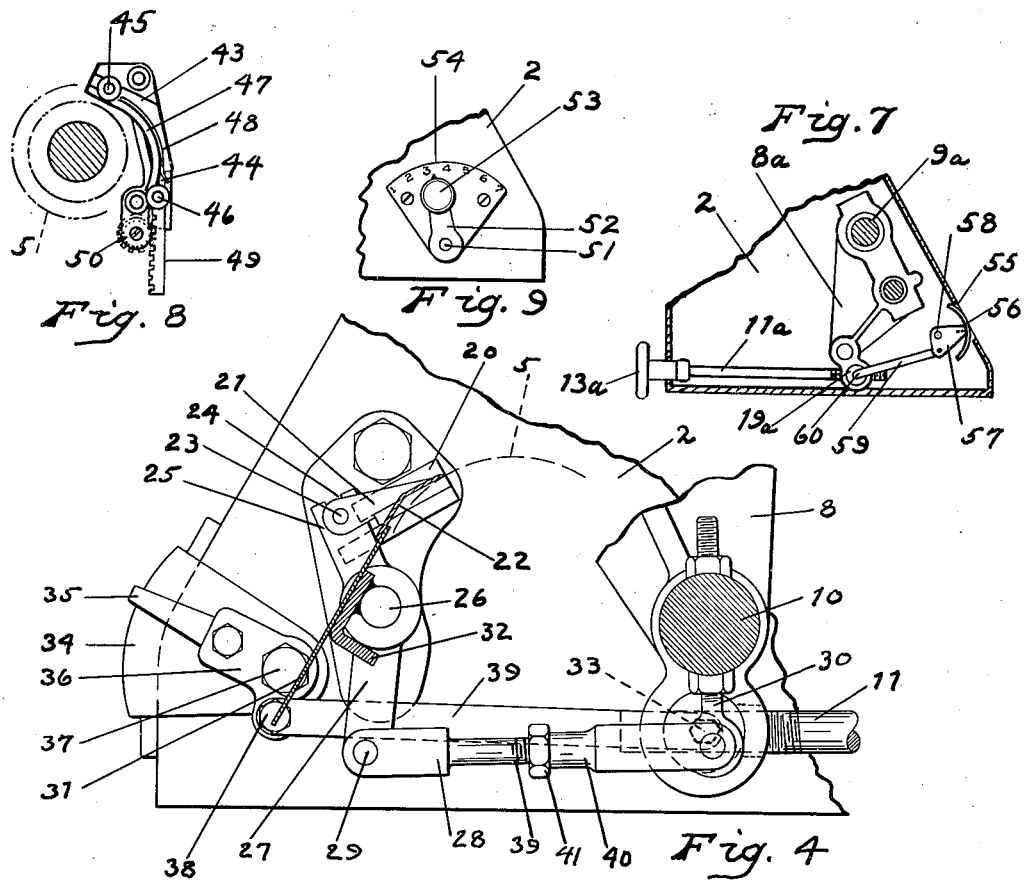

FREDERICK G. RICKER
INVENTOR

BY
ATTORNEY

Patented Aug. 13, 1940

2,211,580

UNITED STATES PATENT OFFICE 2,211,580

CURLING MECHANISM FOR DOUGH MOLDERS

Frederick G. Ricker, Saginaw, Mich., assignor to Baker Perkins Company, Inc., Saginaw, Mich., a corporation of New York Application April 28, 1939, Serial No. 270,481

3 Claims. (Cl. 107—9)

This invention relates to the molding head of a dough molding machine, wherein, pieces of dough are sheeted between pairs of spaced, rotatable sheeting rollers, coiled into cylindrical rolls, and then sized and molded into final shape by pressure applied either by a revolving drum or a moving belt adjacent to and spaced from a stationary molding board.

This invention is particularly concerned with those parts of a dough molder which coils the sheeted dough into a cylindrical roll and assures their proper delivery to the final molding means.

The coiling elements consist of a revolving fluted roller located below the last set of sheeting rolls and in the path of the descending sheet of dough. Between the coiling roller and the lowermost set of sheeting rollers and located in a plane to one side of a plane passing vertically through the axis of the coiling roller, is a pilot roller to assist in the coiling operation and define a coiling pocket formed by the top periphery of the coiling roller and the side periphery of the pilot roller. With such an arrangement, the end of the sheeted dough piece engages the top surface of the fluted coiling roller which is revolved in a direction contrary to the movement of the sheeted dough piece so that the leading end of the dough piece is bent inwardly when it engages the revolving coiling roller and then engages the revolving pilot roller. The action of these two rollers revolving contrary to the direction of the descending dough piece coils it into a cylindrical roll or loaf which lies upon the top surface of the fluted coiling roller and against one side portion of the pilot roller.

The location of the pilot roller with respect to the coiling roller is generally determined by the largest size dough loaf it is desired to make, and this location is so determined that when the largest loaf has been completely coiled, its center of gravity is to one side of a plane passing vertically through the axis of the coiling roller so that its own weight and the offset gravitational force will discharge the coiled dough loaf from the coiling roller.

If a small loaf of dough is being coiled, it will lie on the coiling roller adjacent the pilot roller with its center of gravity nearer a vertical plane passing through the center of the coiling roller, consequently the spinning force of the roll overcomes the gravitational force and the dough loaf will remain on the coiling roller. The next descending dough piece will then strike the coiled loaf and both pieces, one coiled, the other in a sheet, will be discharged into the molding channel. The result will be a double loaf, or if the dough is of a very soft nature, the outer skin will be ruptured and the soft inner mass will be smeared over the pressure parts of the molder, requiring a shutdown to remove this soft dough.

To overcome this defect, there has hitherto been provided a curved shield partially surrounding the coiling roller and adjustable over its periphery so that the upper edge of the curved shield will engage the spinning dough piece as soon as it is completely coiled and cause it to be discharged from the roller. When a smaller loaf of dough is molded, the shield is adjusted upwardly to engage the spinning surface of the dough at the moment it has reached its largest diameter. In certain kinds of dough these small pieces, owing to their light weight, will slip against the engaging edge of the curved shield and remain on the coiling roller momentarily and cause the next oncoming dough piece to engage the spinning dough coil and both will be discharged with the previously mentioned result.

The present invention consists of means to adjust the molding pocket according to the size of dough loaf being molded so that the weight of the mass of coiled dough beyond the said vertical plane will overcome the spinning force of the coiling roller and assure a quick positive discharge of the coiled dough piece as soon as it has been coiled.

The invention further provides a take-off plate which may be used on certain types of dough and which is adjustable with relation to the pilot roller and simultaneously therewith so that its upper or leading end will be in the proper position to receive the coiled dough loaf from the coiling roller and properly guide it into the molding channel.

It is therefore a prime object of this invention to provide a molding head of the class described wherein the working surface of the coiling roller or coiling pocket is definitely established, according to the size of the loaf being molded, by a relative adjustment of coiling roller and pilot roller so that the coiled dough loaf is thus positively discharged upon completion of the coiling operation and before the next succeeding dough piece can strike it.

It is a further object of this invention to provide a take-off plate which is adjustable over the surface of the coiling roll and which is moved in definite predetermined relation to the pilot roller whereby the coiled dough loaf is properly guided into the molding channel upon its discharge from the coiling roller.

It is a still further object of this invention to provide means in the connection between the adjusting members of the pilot roller and guide plate so that these members may be adjusted relative to one another to vary the relative working surfaces of the coiling roller and the end of the take-off plate according to the nature and size of the dough being molded and the tightness of the coil desired.

It is a still further object of this invention to provide a simple, positive and inexpensive coiling mechanism which will produce a better coil of dough, eliminate many of the doubles, and produce a final baked loaf with more uniform texture and grain.

With these and certain other objects in view, which will appear later in the specification, this invention comprises the devices described and claimed and the equivalents thereof.

Referring now to the drawings:

Fig. 1 is a rear elevation of a molding head of a dough molder, broken away in parts and showing the principal elements of the invention.

Fig. 2 is a cross sectional elevation on the line 2—2 of Fig. 1 with the pilot roller and coiling roller set to mold a small sized loaf of dough.

Fig. 3 is a view similar to Fig. 2 with certain parts omitted and showing the rollers set to coil a large loaf of dough.

Fig. 4 is an enlarged diagrammatic sectional elevation similar to Fig. 2 but with certain parts omitted to more clearly show the connecting parts of the take-off plate and pilot roll adjusting mechanism.

Fig. 7 is a more or less diagrammatic sectional elevation with certain parts omitted to show the pilot roller supporting frame and the means for adjusting the pilot roller and indexing its position.

Fig. 8 is a detail of the take-off shield and its operating parts.

Fig. 9 is a detail of the shield adjusting knob and index.

Figure 5:
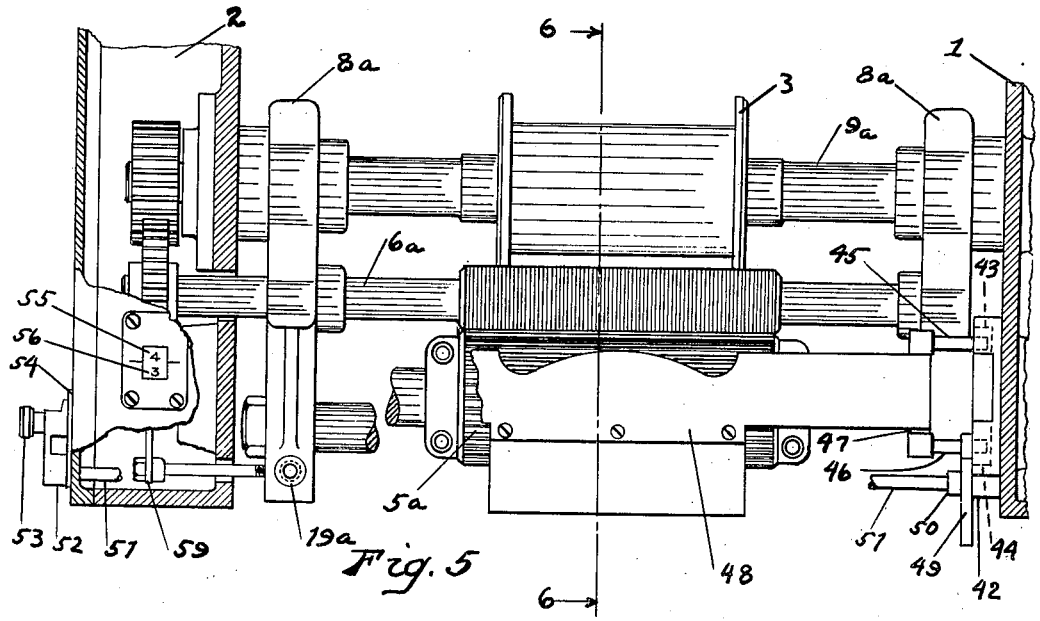
Fig. 5 is a front view of the parts shown in Fig. 1 but having therein certain modifications.

A molding head generally comprises a pair of spaced side frames 1—2 having journalled therein a plurality of pairs of sheeting rollers the lower pair 3—4 of which is shown in the drawings. Also journalled in the side frames 1—2 is a fluted coiling roller 5 which engages the lower end of the descending dough sheet and bends it back upon itself thus causing the dough pieces to be coiled into a cylindrical loaf.

The coiling roller 5 is rotated in the direction of the arrow shown in the drawings, that is toward the descending sheets of dough and at a speed commensurate with the speed of the descending dough piece so that the dough piece will be completely coiled before its own weight will cause it to roll off of the spinning coiling roller 5.

To assure that the dough piece is discharged on the proper side of the coiling roller and also to assist in properly coiling the dough piece a pilot roller 6 is located between one of the lowermost of the sheeting rollers as 3 and above the coiling roller 5. The various rollers are driven by a train of gears or chains from a source of power not shown.

In the present invention the pilot roller 6 is made adjustable with relation to the coiling or effective working surface of the coiling roller. This is accomplished by journalling the shaft ends of the pilot roller 6 in a pair of pivotal yokes 7—8 so that the pilot roller may be adjusted over the periphery of the coiling roller to assure that any size of coiled dough loaf will be positively discharged from the working surface of the coiling roller by bringing the center of gravity of the coiled dough loaf to one side of a vertical plane A passing through the axis of the coiling roller. The line B designates the point on the periphery of the coiling roller at which the dough loaf leaves the coiling roller. The dimensions C, C' in Figs. 2 and 3, respectively, designate the relative position of the coiling roller and pilot roller for a small and large loaf, and the dimension D designates the size of the coiling pocket for the extreme sizes of dough loaf.

The pilot roller supporting yokes 7—8 are preferably pivoted on the shaft 9 supporting one of the sheeting rollers and are maintained in their proper spaced relation by a spacer bar 10 secured at its ends to the lower portion of said supporting yokes 7—8.

The pilot roller is adjusted over the effective working surface of the coiling roller by an adjusting rod 11 rotatively received at one end in an eyebolt 12 secured in one of the side frames as 2. A handwheel 13 is secured to the end of the adjusting rod 11 so that the rod may be rotated.

To prevent axial movement of the rod 11, the hub 14 of the hand wheel 13 abuts one side of the eyebolt 12 and a set collar 15 abuts the other side with sufficient clearance to permit rotation but no axial movement of the rod 11.

The opposite end of the adjusting rod 11 is threaded as at 16 and extends through an enlarged bore 17 in an extension 18 of one of the pilot roller supporting yokes as 8 and also into the threaded bore of a floating nut 19 rotatively received in a transverse bore in the yoke extension 18. When the hand wheel 13 is rotated the floating nut 19 traverses the threaded end 16 of the adjusting rod 11 and swings the pilot roller supporting yokes 7—8 about the shaft 9 of the sheeting roll 3 thus moving the pilot roller 6 over the working surface of the coiling roller 5.

The arrangement of the floating nut 19 prevents binding of the parts as the pilot roller supporting yokes 7—8 are moved angularly about shaft 9.

The present invention also contemplates a take-off plate which is adjustable automatically and simultaneously with the adjustment of the pilot roller so that the coiled dough piece is properly delivered into the molding channel of those parts, (not shown but well understood by those skilled in the art) which seals the coil and molds it into its final size for the baking pans.

The above results are accomplished by means of a pair of guide channels 20 secured to the inner faces of the side frames, one of which is shown in Fig. 4. Slidingly mounted in the guide channel 20 is an arm 21 to which is secured the upper take-off plate 22. The opposite end of the arm 21 has a stud 23 received in a recess 24 in the upper end of a bell crank lever 25, which is pivoted intermediate its ends on a stub shaft 26 journalled in the side frames. The lower end 27 of the bell crank lever is connected to the tie rod 10 by an adjustable connecting rod 28 pivoted as at 29 at one end to the lower end 27 of the bell crank lever and at its opposite end to an eyebolt 30 threaded in the tie rod 10, thus when the threaded rod 11 is rotated by the handwheel 13 to move the pilot roller supporting yokes the pilot roller 6 moves over the surface of the coiling roller 5 in one direction while the upper take-off plate 22 moves in the opposite direction.

The lower end 31 of the take-off plate is secured to an angle bar 32 welded to the projecting ends of the bell crank lever shaft 26 and underlaps the lower ends of the upper take-off plate 22, thus, when the upper end of the take-off plate is adjusted over the periphery of the coiling roller the lower end 31 of the lower take-off plate is adjusted proportionate to the size of the molding channel.

To indicate to the operator the relation of the pilot roller to the coiling roller, so that he may know the exact setting of these parts for a certain size of loaf and in order that he may at a future period duplicate that size of loaf, a suitably graduated scale plate 34, is provided on one of the side frames of the molding head, also an index pointer 35 is provided to move over the scale.

The index pointer 35 is secured to one arm of a bell crank lever 36 pivoted as at 37 to a side plate of the index while the lower end of the bell crank lever is pivotally connected as at 38 to a link 39, pivoted at its opposite end to the floating nut 19 by a stud bolt 33, thus, when the pilot roller and take-off plate is adjusted the index hand will indicate their position on the scale plate so the operator may quickly and with certainty know the exact setting of the coiling mechanisms for the size loaf he wishes to produce.

In order to adjust the relative positions of the pilot roller 6 and the upper take-off plate 22, an adjustable connection is provided in connection rod 28. One end as 39 of the connecting rod is threaded into an enlarged portion 40 of the other half of connecting rod 28.

By removing pivot pin 29 and turning the externally threaded portion 39 the take-off plate 22 may be moved closer or further from the pilot roller 6. After the adjustment is made the parts are held in their adjusted positions by a lock nut 41.

Figure 6:
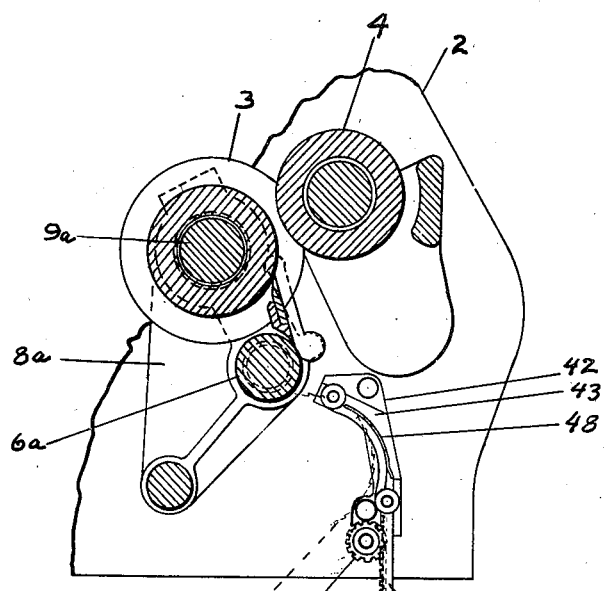
Fig. 6 is a cross sectional elevation on the line 6—6 of Fig. 5 with parts omitted to show the pilot roller supporting frame.

Referring now to Figs. 5 to 9, an alternative form is shown having slight modifications and which form is preferable when it is desired to adjust the take-off plate independently of the pilot roller. This modification also shows a type of take-off plate which is preferred for certain types of molders. Referring particularly to Figs. 5-6 and 8 a pair of guide plates 42 are provided on both of the side frames, however, particularly in Fig. 5, only one of these guide plates is shown on the right-hand side frame 2.

The guide plates comprise a pair of guide channels 43 and 44 (see Fig. 8). Both channels are arranged tangential to the coiling roller 5 the channel 43 being tangential to the top and the channel 44 being tangential to the side of the coiling roller. Slidingly received in each of these channels are pins 45 and 46 and opposite ends of the pins are connected by a curved plate 47 to which is attached the upper take-off plate 48.

Secured to lower end of curved plate 47 is a rack 49 meshing with a pinion 50 secured to a shaft 51 which extends across the molding head to the outside of the frame 1 (see Figs. 5 and 6). For the sake of clearness in Fig. 5 the central part of the shaft is broken away in order that it will not be confused with certain other parts, however, the same reference number 51 is shown on both parts of the shaft. Secured to the opposite end of the shaft is an index hand having at its upper end a knob 53 which oscillates the shaft when the knob is moved by the operator (see Figs. 7 and 9), thus, rotating pinion 50 and moving rack 49 causes the take-off plate 48 to move through a definite path, the upper end being moved tangentially toward or away from the roller and the lower end being moved vertically.

To indicate to the operator the exact position of the take-off plate an index plate 54 bearing indices is secured to the outside of frame 1 (see Fig. 5).

In the present modified form the pilot roller 6a is adjusted over the periphery of the coiling roller 5a by means of a hand wheel 13a and threaded rod 11a in the same manner as previously described in relation to Figs. 2-3-4, however, the indicator is read through a sight opening 55 (see Fig. 5) and the indices are engraved on a curved plate 56 which is secured to the end of one arm of a bell crank 57 pivoted at 58. The other end of the bell crank is connected by a bar 59 and a stud 60 secured to the floating nut 19a engaging yoke 8a. Thus, when the pilot roller supporting yoke 8a is rocked about shaft 9a the bar 59 rotates the bell crank lever 57 and brings before the sight opening 55 the proper index on index plate 56, thus, the operator knows definitely the position of the pilot roller and the size of the dough loaf he wishes to mold.

While it has been shown that the pilot roller is adjusted with relation to the coiling roller it is obvious that the pilot roller could be stationary and the coiling roller could be adjusted relative to the pilot roller without departing from the spirit of this invention or the scope of the appended claims.

Having thus described my invention, what I claim and desire to secure by Letters Patent is:

1. In a molding head for a dough loaf molding machine comprising sheeting rollers, a coiling roller, a pilot roller above said coiling roller, a guide plate partially surrounding a surface of said coiling roller to guide a coiled dough loaf away from said coiling roller, means to guide said plate in a predetermined path, and means to adjust said pilot roller over the periphery of said coiling roller and also to simultaneously move said guide plate in said guide means through said predetermined path proportionally to and in a direction opposite the movement of said pilot roller.

2. In a molding head for a dough loaf molding machine comprising sheeting rollers, a coiling roller, a pilot roller pivotally mounted to move about the periphery of said coiling roller, a guide plate having an upper portion partially surrounding a surface of said coiling roller and a substantially straight lower portion to guide a coiled dough loaf away from said coiling roller, guide means to guide the said upper portion in one direction and means to guide said lower portion in a different direction, adjusting means to move said pivotally mounted pilot roller over the peripheral surface of said coiling roller and adjusting means for said guide plate coupled to said pilot roller adjusting means to move said guide plates according to the size of dough loaf being molded.

3. In a molding head for a dough loaf molding machine comprising sheeting rollers, a coiling roller, a pilot roller above said coiling roller, a guide plate partially surrounding a surface of said coiling roller to guide a coiled dough loaf away from said coiling roller, guide means for said guide plate, means to adjust said pilot roller over the peripheral surface of said coiling roller, means to move said guide plate in said guides through a predetermined path, a connection between said pilot roller adjusting means and said guide plate moving means whereby both pilot roller and guide plate are moved in a direction opposite each other, and means in said connection to adjust the relative positions of the pilot roller and guide plate.

FREDERICK G. RICKER.